Jan. 5, 1965   F. H. TENNIS   3,164,166
PILOT OPERATED PRESSURE AND VACUUM RELIEF VALVE
Filed June 14, 1962   2 Sheets-Sheet 1

Inventor
Francis H. Tennis
By
Attorney

Jan. 5, 1965   F. H. TENNIS   3,164,166
PILOT OPERATED PRESSURE AND VACUUM RELIEF VALVE
Filed June 14, 1962   2 Sheets-Sheet 2
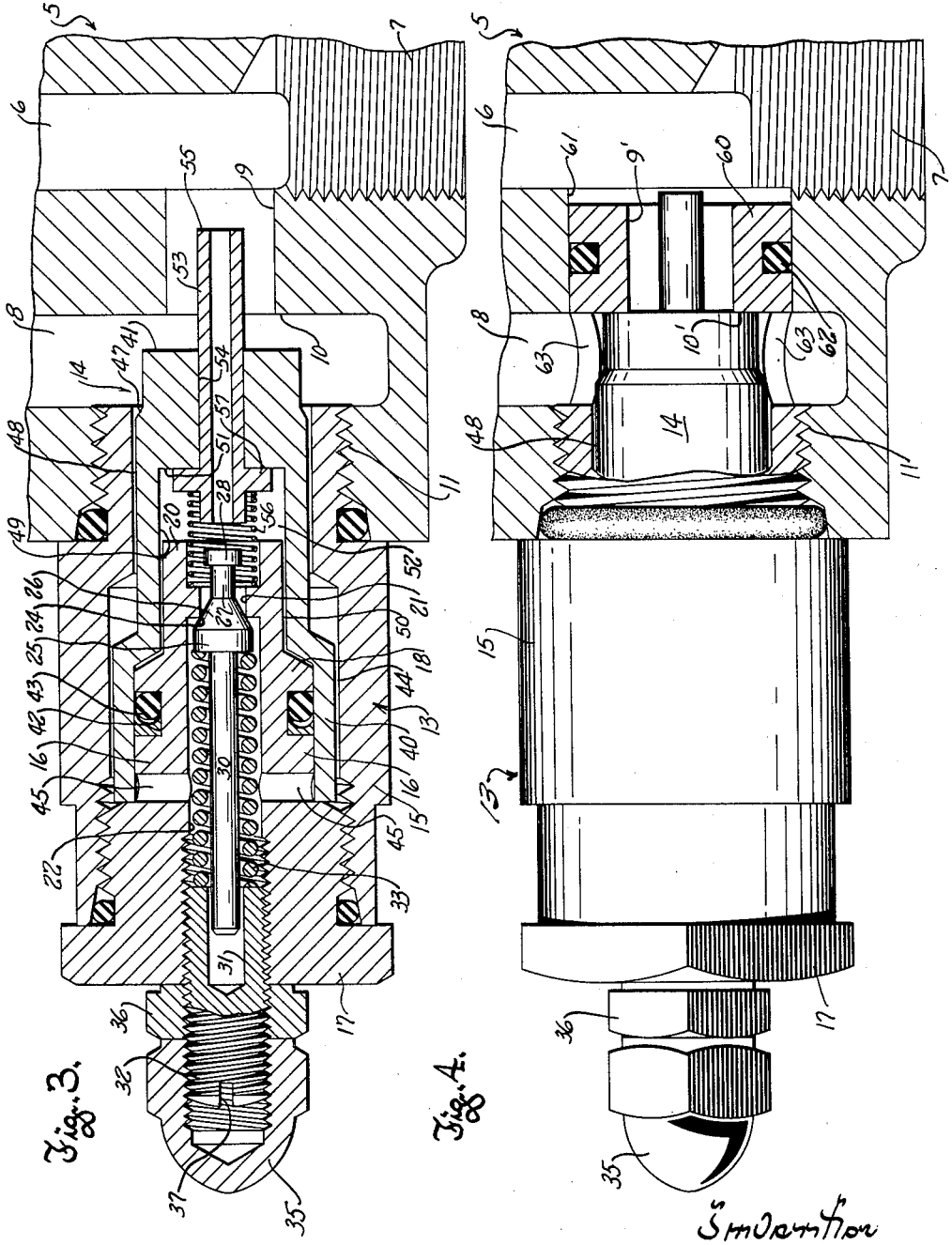
Inventor
Francis H. Tennis

United States Patent Office 3,164,166
Patented Jan. 5, 1965

3,164,166
PILOT OPERATED PRESSURE AND VACUUM
RELIEF VALVE
Francis H. Tennis, Milwaukee, Wis., assignor to Hydraulic
Unit Specialties Company, Pewaukee, Wis., a corporation of Wisconsin
Filed June 14, 1962, Ser. No. 202,508
8 Claims. (Cl. 137—491)

This invention relates to fluid pressure operated systems and to the relief of both abnormally high and abnormally low pressure conditions in such systems.

More particularly, this invention concerns pilot operated relief valves for fluid pressure systems, and particularly to relief valves of the type which have a poppet mechanism that is caused to open both at times when the pressure of fluid in a system in which the valve is connected reaches a predetermined high relief value, and also at times when such pressure falls below a predetermined low value.

The purposes and objects of this invention are generally similar to those of my copending application, Serial No. 153,415, filed November 17, 1961, now Patent No. 3,100,503 dated Aug. 13, 1963 and entitled Pilot Operated Pressure and Vacuum Relief Valve. As explained therein, a passage in the front of the poppet mechanism allows fluid at supply line pressure to be admitted to a chamber inside the valve mechanism, where such fluid exerts a force on an internal part of the poppet mechanism to normally hold it in an operative or closed position against the unseating force which supply line fluid exerts on an external part of the poppet mechanism. In its normally operative position, of course, the poppet mechanism blocks a relief passage that communicates the supply line with a low pressure return line.

Pressure fluid in the chamber also exerts a force upon a pilot poppet tending to unseat the same, and this unseating force is normally yieldingly resisted by a substantially strong spring that urges the pilot poppet to a closed position blocking an exhaust passage that leads from the chamber. The pilot poppet opens when the pressure of fluid in the supply line, and hence in the chamber, rises to an abnormally high value, to effect venting of the chamber through the exhaust passage, thus enabling the poppet mechanism to be opened as a consequence of the force which supply line fluid exerts upon said external part thereof.

The aforesaid copending application also discloses that the passage which provides for communcation of said chamber with the supply line or other source of fluid under pressure should have a substantially small effective cross sectional area to insure the desired precise and chatter free operation of the poppet mechanism during the relief of an excessively high pressure condition; but that where the poppet mechanism is designed to open in response to an abnormally low pressure condition within the supply line and allow fluid to flow thereto from the return line, the effective cross sectional area of said passage should be substantially larger to assure prompt opening of the poppet mechanism in response to such an abnormally low pressure condition.

The aforesaid copending application features a relief valve that embodies throttling check valve means to achieve the desired small diameter passage for high pressure relief and larger diameter passage for vacuum relief. This enables the chamber inside the valve mechanism to be quickly evacuated whenever the pressure in the fluid supply line drops to a value lower than that of fluid in the return line, as for instance when a void tends to form in that end of a hydraulic cylinder with which the supply line connects. In that event, the poppet mechanism opens in response to the low pressure condition that exists in the supply line and provides for the transfer of low pressure fluid from the return line to the supply line to prevent drawing a vacuum in the cylinder.

This invention has as its purpose to provide an improved combined high pressure relief and void control valve of the character described, featuring simplified throttle valve means for controlling the flow of pressure fluid through the passage that communicates the high pressure supply line and the chamber within the valve mechanism, and wherein the relief valve mechanism generally is far simpler and easier to manufacture.

More specifically, it is the purpose of this invention to provide a combined high pressure relief and void control valve of the character described, wherein the passage that communicates the supply line with the chamber within the relief valve mechanism comprises a tube in the front portion of the main poppet, that is free to slide rearwardly into the chamber in response to the drop in pressure that occurs therein as a result of opening of the pilot poppet, to a position at which the rear of the tube abuts and is substantially closed by a valve disc on the front of the pilot poppet.

With this arrangement, though the tube will be substantially closed at its rear by the valve disc on the pilot poppet, fluid is permitted to slowly flow into the chamber, either through clearance space around the exterior of the tube or between its rear end and the valve disc. However, such flow of high pressure fluid into the chamber will always be restricted to a rate considerably lower than that at which fluid exhausts from the chamber through the passage that vents it whenever the pilot poppet opens.

It is a further object of this invention to provide a combined high pressure relief and void control valve mechanism of the character described wherein said chamber venting passage comprises clearance space around the exterior of the main poppet mechanism, between it and a portion of the body in which the poppet mechanism operates. This has the advantage of reducing and minimizing costly machining operations.

With these and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two examples of the physical embodiments of the invention constructed according to the best modes so far devised for the practical application of the principles thereof, and in which:

FIGURE 3 is a longitudinal sectional view similar to FIGURE 1, but showing how the valve functions to relieve an abnormally low pressure condition arising within the service passage of the control valve; and FIGURE 4 is a view partly in elevation and partly in longitudinal section, of a slightly modified embodiment of the invention.

Figure 1:
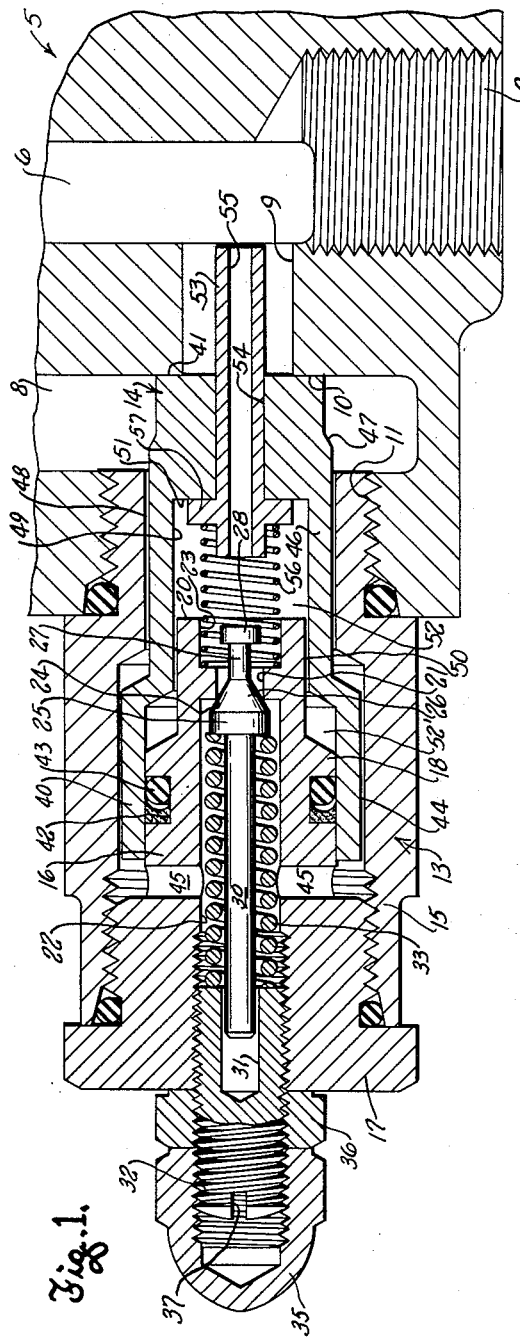
FIGURE 1 is a longitudinal sectional view of the relief valve of this invention, illustrating its application to a hydraulic control valve.
Figure 2:
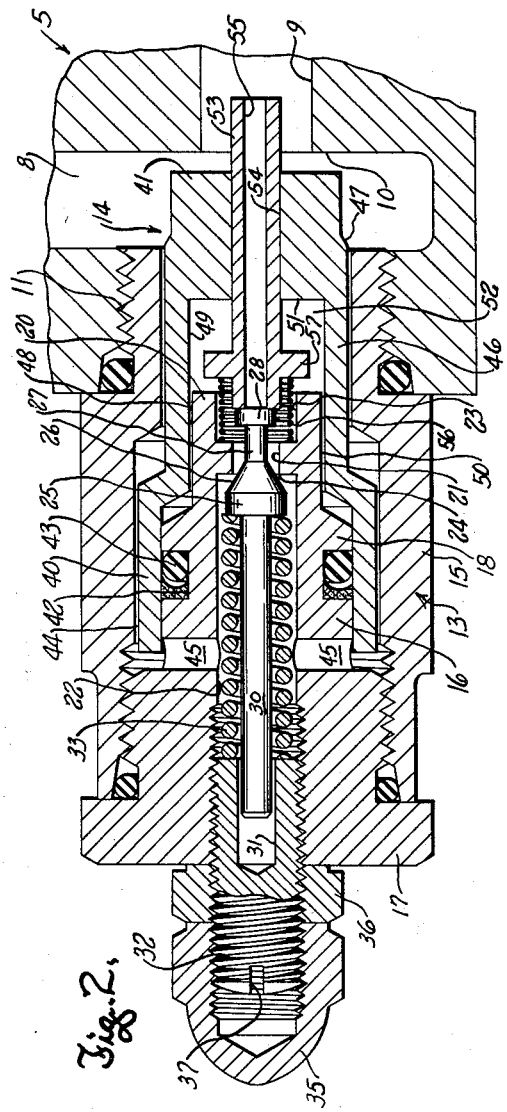
FIGURE 2 is a view similar to FIGURE 1, showing how the relief valve functions to relieve an abnormally high pressure condition arising in a service passage of the control valve.

Referring now to the accompanying drawings, FIGURES 1 to 3, inclusive, illustrate the simplest form of the relief valve of this invention in which it is ideally suited for use with a hydraulic control valve or the like. The control valve, which may be of conventional construction, has a housing 5, a service passage 6 leading to a motor port 7, and an exhaust or return passage 8 extending lengthwise alongside the service passage. For the purposes of the invention, it is also provided with a bypass 9, the inner end of which connects with the service passage 6, and the outer end of which opens to the return passage 8 through an annular valve seat 10. The seat 10 may comprise a flat surface on the inner wall of the return passage 8, that is normal to the axis of the bypass 9 and faces outwardly toward an internally threaded hole 11 in the adjacent end of the control valve housing, coaxial with the bypass 9.

The combined high pressure relief and void control valve of this invention has a casing 13, the forward portion of which is shown as threaded into the hole 11 in the control valve housing, and a poppet mechanism 14 endwise slidably mounted in the casing projects from the open front end thereof and into the return passage 8, for cooperation with the seat 10 to thereby control communication between the service and return passages 6 and 8, respectively, in accordance with the pressures obtaining in said passages. The casing 13 of the valve mechanism comprises a tubular outer shell 15, the forward end of which is screw threaded to fit the hole 11 in the valve body, and a tubular inner member 16 having a plug-like head 17 that is screw threaded into and closes the outer or rear end of the outer shell 15. Forwardly adjacent to its head 17, the inner member is reduced in diameter to provide a cylindrical support 18 coaxial with the head 17 and upon which the main poppet 14 is endwise slidably mounted. A front part 20 on the inner member projects forwardly from the support 18, coaxially therewith, and both it and the poppet support are spaced a distance from the wall of the outer shell 15. Wherever compactness is a requisite, the front part 20 is made smaller in diameter than the support 18, as shown.

The tubular inner member 16 has a coaxial hole 21 in the front part 20 thereof, which opens to the rear of the member through a long counterbore 22 and to the front of the member through a shorter counterbore 23. The rear edge 24 of the hole 21 defines an annular valve seat that is normally engaged by a pilot poppet 25 in the rear counterbore 22. The pilot poppet has a forwardly convergent nose 26 that cooperates with the seat 24 and projects forwardly into the hole 21 where it joins with a stem 27 substantially smaller in diameter than the hole 21 and having a disc 28 fixed to its forward end and located within the front counterbore 23.

The pilot poppet is guided for back and forth motion toward and from engagement with the valve seat, and for that purpose, it is provided with a stem 30 that projects rearwardly from the poppet and into a forwardly opening well 31 in the rear of a screw 32 that is threaded into the rear end of the counterbore 22 and closes the latter. A strong coiled compression spring 33 encircling the stem 30 on the pilot poppet reacts between the front end of the screw 32 and the pilot poppet to urge the latter firmly onto its seat 24 with a force that may be adjusted by rotating the screw 32 in one direction or the other. An acorn nut 35 threaded over the outer end of the adjusting screw 32 and against a half nut 36 on the screw serves to hold the latter in any position of adjustment and to also block access to the screw driver slot 37 in the outer end of the screw.

The main poppet 14 is also tubular. It has a cylindrical sleeve 40 on its rear that is slidably received upon the poppet support 18, so that the main poppet is guided thereby for endwise back and forth motion, toward and from a normally operative position at which its front end portion 41 engages the seat 10 on the control valve to close the bypass 9 between the service and return passages 6 and 8 respectively. The support 18 has a circumferential groove 42 therein, containing an O ring seal 43, which bears against the inside of the sleeve 40 to afford a liquid tight seal between the sleeve and the support 18 encircled thereby. The outer surface of the sleeve 40 is spaced a distance from the interior of the outer shell 15, as at 44, for a purpose to be later described, and it should be noted that the rear of the main poppet lies forwardly of radial holes 45 in the wall of the inner member 16, at the front of its head 17, when the main poppet is engaged with its seat 10.

Forwardly of the sleeve 40, the main poppet may have an intermediate portion 46 of reduced diameter that terminates at a forwardly facing circumferential shoulder 47 at the junction of the intermediate portion 46 and the still smaller diameter front end portion 41 of the main poppet. The intermediate portion 46 fits in the smaller diameter front part of the outer shell 15, and its exterior is also spaced a substantial distance from the bore in the outer shell, as at 48, for a purpose to be later described. The bore 49 in the intermediate poppet portion 46 also preferably loosely receives the reduced forward portion 20 on the inner member 16 of the casing, with substantial clearance 50 therebetween, and it will be observed that the bore 49 is larger in diameter than the bypass 9.

The bottom 51 of the bore 49 is located sufficiently far forwardly of the front 20 of the inner casing member 16 as to define a pressure chamber 52 into which pressure fluid can flow via a tube 53 that is loosely slidably mounted in the front of the main poppet, in a small diameter coaxial bore 54 therein. The tube 53 extends forwardly beyond the front of the main poppet and into the bypass 9, and it thus communicates with the service passage 6, to conduct fluid therefrom into the pressure chamber 52.

Note that the tube 53 has a bore 55 therethrough that is substantially large in diameter and provides a control passage which normally allows substantially free transfer of fluid between the chamber 52 and the service passage 6.

Thus, under ordinary conditions, as when normal high pressures obtain in the service passage 6, fluid at service passage pressure is maintained in the pressure chamber 52, where it exerts a forward bias on the surface 51 of the main poppet sufficient to hold it engaged with its seat 10, against the unseating force that fluid in the bypass 9 exerts upon the front of the main poppet. This forward bias results from the fact that the internal surface 51 on the main poppet has a greater area than that portion of its front end which is acted upon by pressure fluid in the bypass 9. In cases where, for reasons of compactness, the intermediate portion 46 of the main poppet is reduced in diameter to an extent such that the surface 51 at the bottom of the bore 49 therein is smaller in area than the bypass 9, the necessary forward bias is nevertheless obtained due to the presence of pressure fluid in the larger diameter auxiliary chamber 52′ inside the front portion of the poppet sleeve 40, and which is communicated with the chamber 52 by the clearance space 50 around the front part 20 of the inner body member 16.

As long as the pressure of the fluid in the chamber 52 remains below a predetermined high value corresponding to the relief setting of the pilot poppet spring 33, the pilot poppet 25 will remain closed, and the main poppet will thus also be held closed by the force of fluid in the chamber 52.

As soon as the pressure in the service passage, and hence in the chamber 52, rises to an abnormally high value, however, such fluid acts upon the pilot poppet to unseat the same, and thereby allow the main poppet to open and permit fluid in the service passage to flow to the return line 8.

The main poppet opens in consequence of such unseating of the pilot poppet by reason of the fact that the pressure chamber 52 is vented to the return line whenever the pilot poppet opens. At such times, fluid from chamber 52 flows rearwardly through the hole 21 in the inner member 16, past the pilot poppet, and out through the radial holes 45 to the space at the rear of the sleeve 40 on the main poppet, from whence the fluid is free to discharge to the return passage 8 through the generous clearance spaces 44 and 48 between the main poppet and the outer shell surrounding it. Such venting or exhaust of fluid from chamber 52 when the pilot poppet opens, of course, allows the main poppet to be moved rearwardly off of its seat 10 to the position seen in FIGURE 2, in consequence of the unseating force which fluid in the service passage and bypass 9 exert upon the front of the main poppet.

As soon as fluid begins to exhaust from the pressure chamber 52 in the manner described, the tube 53 carried by the main poppet is immediately moved rearwardly to a position such as seen in FIGURE 2, where its rear end seats upon and is substantially closed by the disc 28 on the front of the pilot poppet. This results from the sudden drop in pressure in the chamber 52 caused by opening of the pilot poppet, and the force which fluid in the service passage exerts upon the front of the tube. In fact, that rearward force upon the tube is relied upon to hold the pilot poppet open until the abnormally high pressure condition in the system is relieved.

Although the rear end of the tube 53 is caused to abut the disc 28 on the front of the pilot poppet during relief of an abnormally high pressure condition in the system, fluid from the service passage continues to flow into the pressure chamber 52 in the interior of the valve mechanism, but at a controlled and restricted rate. Such flow may take place around the exterior of the tube 53, which loosely fits the bore 54 in the nose of the main poppet, or fluid may travel through the passage 55 in the interior of the tube and leak out of its end, past the disc 28 engaged thereby. In either event, the flow of pressure fluid into chamber 52 during the high pressure relief function of the valve mechanism is always restricted to an amount less than can exhaust from the chamber through the vent or exhaust passage provided by the bore 22, the radial holes 45, and the clearance spaces 44 and 48. In this respect, the disc 28 on the front of the pilot poppet cooperates with the rear end of the tube 53 to define a throttling check valve for the control passage 55, which check valve is rendered operative to restrict the control passage only at times when the pilot poppet is opened, and in consequence of unseating thereof. At all other times, the control passage 55 through the tube 53 remains wide open and unrestricted.

As shown, a spring 56 exerts a substantially light forward biasing force upon the tube 53, to normally maintain it in a forward position defined by the engagement of a circumferential flange 57 on its rear portion with the bottom 51 of the counterbore 49 in the main poppet. Because of the engagement between the flange 57 and the bottom 51 of the counterbore 49, the spring 56 exerts a light yieldable biasing force upon the main poppet, tending to hold it engaged with its seat 10. In fact, the spring 56 is intended primarily to serve the latter biasing function, and could bear directly upon the bottom 51 of the counterbore. The tube 53, of course, can be shifted back and forth in its bore 54 by pressure fluid alone, depending upon whether fluid flows rearwardly through the tube and into the chamber 52, or forwardly from the chamber 52 out of the tube and to the service passage, in response to a drop in pressure therein to a value below that of fluid in the return or exhaust passage 8.

As will now be discussed, such a drop in pressure in the service passage causes the main poppet to open, thus allowing fluid to flow to the service passage from the return passage and preventing formation of a void in a hydraulic cylinder having one end connected with the service passage. It is not unusual in certain hydraulically driven apparatus that the load moved by a double acting hydraulic cylinder will at times drive the piston of the cylinder in its retraction stroke, for example, faster than pressure fluid can be fed into the cylinder to effect controlled retraction of the piston. When that situation arises, a void is drawn in the cylinder, and control over the piston thereof is lost until the cylinder fills with pressure fluid from the pump associated with the system.

As seen in FIGURE 3, however, the main poppet of the combined high pressure relief and void control valve of this invention opens in response to any decrease in the pressure of fluid in the service passage 6 to a value below that of fluid in the return passage 8, to thereby effect flow of return fluid into the service passage through the bypass 9 and assure against drawing a void in the cylinder with which the service passage 6 may be connected. The main poppet opens at such times because of the unseating force that fluid in the return passage 8 exerts upon the circumferential forwardly facing shoulder 47 on the front portion 41 of the poppet. The fluid in passage 8, of course, will be at reservoir pressure, which may be atmospheric or slightly above, and more than sufficient to effect unseating of the main poppet as the pressure in the service passage drops below atmospheric and approaches zero.

It is of the essence that the control passage 55 in the nose of the main poppet be at maximum effective diameter, that is, unrestricted by the throttling check valve afforded by the disc 28 and the rear end of the tube 53, for prompt opening of the main poppet in response to drop in pressure in the service passage to a value below that of fluid in the return passage. Such opening of the main poppet depends upon how fast fluid can be evacuated, or expelled to the service passage from the pressure chamber 52, and unless the control passage 55 in the tube 53 is wide open, the main poppet may not respond fast enough to prevent a void from being drawn in the end of a hydraulic cylinder connected with the service passage 6.

After such void control response of the valve mechanism, the main poppet will move forwardly to its normal operating position engaging the seat 10 as soon as the pressure of fluid in the service passage 6 rises to a value approximately equaling that of fluid in the return passage 8, or when the force of the spring 56 added to the force exerted by the rising pressure of fluid in the pressure chamber 52 overcomes the unseating force which return fluid imposes on the circumferential shoulder 47 on the front portion of the main poppet.

From the above, it will be seen that the void control poppet 14 functions in the manner of a reverse acting check valve in that it remains closed in response to normally high pressures in the service passage 6 that would unseat a conventional check valve, and opens in consequence of decrease in pressure in the service passage, in a direction counter to the direction of void control fluid flow through its seat to the service passage. To the extent that the valve mechanism of this invention comprises a poppet 14 which functions in the manner of a reverse acting check valve, this application concerns subject matter that was disclosed but not claimed in my aforesaid copending application, now Patent No. 3,100,-503, and in my copending application Serial No. 75,653, filed December 12, 1960, now Patent No. 3,052,218.

As indicated in FIGURE 4, the casing of the combined high pressure relief and void control valve of this invention may be provided with a tubular forward extension 60 of its outer shell 15, coaxial therewith, fitting an enlarged passage 61 that joins the service passage 6 with the return passage 8, and preferably having a liquid tight connection 62 in said passage. This extension has a coaxial hole 9' therein corresponding to the bypass 9 of the first described embodiment of the invention in both size and function. Hence, the hole 9' is adapted to provide a bypass for the transfer of pressure fluid between the service passage 6 and the return passage 8 whenever the main poppet 14 opens, which bypass includes one or more radial holes 63 in the side of the shell 15. These radial holes register with the return passage 8, and are formed in the shell 15 directly behind the seat 10' for the main poppet 14. In this instance, of course, the seat 10' is not formed on the housing of the control valve, as in the first embodiment described, but is located on the extension 60 of the shell 15. Specifically, the seat 10' comprises the rearwardly facing shoulder through which the bypass hole 9' opens to the larger diameter interior of the shell behind the extension 60.

The combined high pressure relief and void control valve of FIGURE 4 is, therefore, a unit complete in itself, and if desired, it could be located anywhere in a hydraulic system, apart from a control valve such as indicated in the drawings. For example, the valve mechanism of FIGURE 4 could have its bypass hole 9' connected with a high pressure fluid supply line of a hydraulic system in any suitable manner, while a single radial hole 63 formed in the side of the shell 15 would provide for connection of the valve mechanism with a return line of the system.

Consequently, it will be appreciated that the service passage 6 in each embodiment of the invention can be considered as a supply line, and the exhaust passage 8 can be considered as a return line. Similarly, the casing members 15 and 16 of the valve mechanism shown in the FIGURE 1 embodiment of the invention can be considered as cooperating with the housing 5 of the control valve to provide a body for the relief valve mechanism, which body is the equivalent of the unitary body disclosed in FIGURE 4.

From the foregoing description, together with the accompanying drawings, it will be apparent to those skilled in the art that this invention provides a valve which features a high pressure relief and void control valve mechanism, and which is unique in that clearance spaces between the components of the mechanism are relied upon to afford an exhaust passage for the pressure chamber in the mechanism, and because of the simplified throttling check valve means provided for the control passage leading to said pressure chamber.

What is claimed as my invention is:

1. A relief valve mechanism of the type comprising a body having a chamber that is communicable with a fluid supply line or other source of fluid at high pressure, an exhaust passage leading from said chamber, a pilot poppet biased to a closed position blocking said exhaust passage but movable to a chamber venting position in consequence of the force which supply line fluid in said chamber exerts thereon whenever its pressure rises to a predetermined relief value, and poppet mechanism having an inner surface upon which pressure fluid in said chamber acts to normally hold the poppet mechanism in a closed position blocking a relief path between said high pressure supply line and a low pressure return line, as long as the pilot poppet remains in its closed position, said poppet mechanism having an outer surface upon which supply line fluid may act to move the poppet mechanism out of said closed position whenever the pilot poppet is opened and fluid is free to exhaust from said chamber, said valve mechanism being characterized by the following features:
   A. means in the poppet mechanism providing a control passage to substantially unrestrictedly communicate said chamber with the supply line;
   B. means on the poppet mechanism defining a surface upon which fluid in the return line may act to effect opening of the poppet mechanism whenever the pressure of fluid in the supply line and the chamber with which it communicates drops to a value below that of fluid in the return line, so as to allow fluid to flow from the return line to the supply line;
   C. and flow restricting means for said control passage comprising cooperating elements carried by the poppet mechanism and the pilot poppet and relatively movable into passage restricting relation in response to the drop in chamber pressure that results from opening of the pilot poppet.

2. The relief valve mechanism of claim 1, wherein said poppet mechanism has a bore, one end of which opens to said chamber and the other end of which opens through said outer surface on the poppet mechanism; and wherein the poppet mechanism carried element of said flow restricting means comprises a tube that is loosely and endwise slidably received in said bore, the tube providing said control passage and being movable inwardly of the poppet mechanism from a defined normal position, in consequence of opening of the pilot poppet, to carry its inner end into cooperating passage restricting relation with the pilot poppet carried element.

3. The relief valve mechanism of claim 2, wherein said pilot poppet carried element comprises a part thereon extending toward and engageable by the inner end of the tube to restrict said control passage at times when the pilot poppet is open.

4. In a pilot controlled relief valve mechanism of the type having a body, a pressure chamber in the mechanism that is communicable with a high pressure fluid supply line, an exhaust passage leading from said chamber, a pilot poppet biased to a closed position blocking said exhaust passage but movable to a chamber venting position in consequence of the force which fluid in the chamber exerts thereon whenever its pressure rises to an abnormally high value, and a main poppet having an inner surface upon which fluid in said chamber acts to normally hold the main poppet in a closed position at which it is adapted to block a relief path between said high pressure fluid supply line and a low pressure return line, as long as the pilot poppet remains in its closed position, said main poppet having an outer surface upon which supply line fluid may act to move the main poppet out of said closed position whenever the pilot poppet is opened and fluid is free to exit from said chamber through said exhaust passage:
   A. said body having
      (1) a rear portion, and
      (2) a hollow poppet carrying part that projects forwardly from said rear portion;
   B. the main poppet having
      (1) a cylindrical skirt which slidingly engages over said poppet carrying part so that the latter supports the main poppet for fore and aft motion toward and from its closed position,
      (2) and a seat engaging front portion, ahead of said poppet carrying part;
   C. seal means providing a sliding fluid tight joint between the engaging portions of the skirt and said poppet carrying part on the body;
   D. the hollow interior of said poppet carrying part opening forwardly to said chamber, defining a portion of said exhaust passage, and containing the pilot poppet;
   E. said chamber being defined in part by said seal means and including portions of the skirt and poppet carrying body part ahead of the seal means;
   F. a counterbore in the front of said poppet carrying body part, ahead of the pilot poppet and opening to said chamber, toward said front portion of the main poppet;
   G. a coiled compression spring in said chamber to lightly bias the main poppet forwardly toward its closed position, one end portion of said spring being received in the counterbore and engaging the bottom thereof;
   H. a tube freely slidably mounted in and extending lengthwise through the front portion of the main poppet to provide a passage by which said chamber is communicable with a fluid supply line, said tube providing for substantially unrestricted exhaust of fluid from said chamber to the supply line at times when the pressure of fluid therein drops to a value below that of fluid in the return line, said spring encircling the rear portion of the tube and the latter having a circumferential flange on its inner portion against which the spring bears to yieldingly hold the tube in a forward limit of sliding motion defined by the engagement of its flange with said inner surface on the main poppet, and said tube being slidable rearwardly against the spring bias thereon in consequence of the reduction in pressure in said chamber that results from opening of the pilot poppet;

I. means on the pilot poppet projecting forwardly into said counterbore for engagement by the rear of said tube to substantially restrict the flow of supply line fluid into said chamber at times when the tube is moved rearwardly relative to the main poppet in consequence of opening of the pilot poppet;

J. and means on the exterior of said front portion of the main poppet providing a surface upon which fluid in the return line may act to effect opening of the main poppet whenever the pressure of fluid in the supply line drops to a value below that of fluid in the return line.

5. The relief valve mechanism of claim 1, further characterized by:
A. a cylindrical skirt on the poppet mechanism slidingly but sealingly engaged over an inner part on the body to support the poppet mechanism for movement between said open and closed positions thereof;
B. and wherein said exhaust passage comprises an annular clearance space between the exterior of the poppet mechanism and a surrounding outer part on the body.

6. In a pilot controlled relief valve mechanism of the type having a body, a pressure chamber in the mechanism that is communicable with a high pressure fluid supply line, an exhaust passage leading from said chamber, a pilot poppet biased to a closed position blocking said exhaust passage but movable to a chamber venting position in consequence of the force which fluid in the chamber exerts thereon whenever its pressure rises to an abnormally high value, and a main poppet having an inner surface upon which fluid in said chamber acts to normally hold the main poppet in a closed position at which it is adapted to block a relief path between said high pressure fluid supply line and a low pressure return line, as long as the pilot poppet remains in its closed position, said main poppet having an outer surface upon which supply line fluid may act to move the main poppet out of said closed position whenever the pilot poppet is opened and fluid is free to exit from said chamber through said exhaust passage:

A. said body having
(1) a rear portion, and
(2) a hollow poppet carrying part that projects forwardly from said rear portion and has a bearing with a cylindrical surface thereon adjacent to said rear portion of the body;
B. the main poppet having
(1) a cylindrical skirt surrounding and slidingly seated upon said bearing on the poppet carrying part so that the latter supports and guides the main poppet for fore and aft motion toward and from its closed position,
(2) and a seat engaging front portion, ahead of said poppet carrying part;
C. seal means providing a sliding fluid tight joint between the engaging portions of the skirt and said poppet carrying part on the body;
D. the hollow interior of said poppet carrying part opening forwardly to said chamber, defining a portion of said exhaust passage, and containing the pilot poppet;
E. said chamber being defined by portions of the main poppet and the poppet carrying body part ahead of said bearing thereon, and being closed at its rear by the seal means;
F. means on said front portion of the main poppet defining a control passage to substantially unrestrictedly communicate said pressure chamber with the supply line;
G. means on said front portion of the main poppet defining a surface upon which fluid in the return line may act to effect opening of the main poppet whenever the pressure of fluid in the supply line and the chamber with which it communicates drops to a value below that of fluid in the return line, so as to allow fluid to flow from the return line to the supply line;
H. and flow restricting means for said control passage comprising cooperating elements on the main and pilot poppets and relatively movable into passage restricting relation in response to the drop in chamber pressure that results from opening of the pilot poppet.

7. Relief valve mechanism which opens when fluid pressure in a high pressure fluid supply line drops to a value only slightly below that of fluid in a low pressure fluid return line to prevent further pressure drop in the supply line, comprising:

A. means defining a body having
(1) a supply passage providing a part of the high pressure fluid supply line,
(2) a return passage providing a part of the low pressure fluid return line, and having a portion which is adjacent to a portion of the supply passage,
(3) a bypass communicating said adjacent portions of the supply and return passages,
(4) and an annular valve seat in said portion of the return passage defined by a surface adjacent to that wall thereof which is closest to the supply passage, said seat defining surface facing away from the supply passage, being coaxial with the bypass, and surrounding the adjacent end thereof;
B. a normally closed hollow relief poppet having a tubular rear portion by which the poppet is mounted in the body, coaxially of and opposite the valve seat, for fore and aft sliding motion toward and from a closed forward position blocking the bypass, said relief poppet having
(1) a reduced front portion with an end surface to engage the seat and close the bypass, an inner portion of said end surface that is surrounded by the seat being exposed to high pressure fluid in the bypass which thereby normally exerts force on the poppet tending to move it rearwardly off its seat,
(2) means providing a substantially unrestricted control passage through said front portion of the poppet by which fluid may be freely transferred between the supply passage and the hollow interior of the poppet,
(3) and rearwardly facing surfaces on the poppet which have an area larger than that of said inner portion of the poppet end surface;
C. cooperating means on the body and on the poppet providing a pressure chamber which is in part defined by said rearwardly facing poppet surfaces, and which chamber is communicated with the supply passage through the control passage so that fluid at normally high pressure fills the chamber and exerts force on said rearwardly facing poppet surfaces to hold the poppet closed against the opening force which fluid at the same high pressure exerts on said inner portion of the poppet end surface, and from which chamber fluid can be substantially unrestrictedly expelled through the poppet control passage to the supply passage in consequence of opening motion of the poppet;
D. annular shoulder means on the exterior of the poppet located between its tubular rear and reduced front portions, providing forwardly facing surfaces upon which fluid in the return passage exerts force to open the poppet whenever the pressure of fluid in the supply passage, and accordingly in the pressure chamber, drops to a value slightly less than that of fluid in the return passage, and below which valve a void tends to form in a cylinder supplied with fluid from the supply line with which the supply passage is communicated, said seat engaging surface of the poppet moving rearwardly away from said wall of the return passage during such opening of the poppet so as to quickly establish a substantially unrestricted flow path along which a large volume of fluid can flow from the return passage to the supply passage via the bypass for void prevention, and such poppet opening motion being substantially unhindered by concomitant expulsion of fluid from the pressure chamber to the bypass to thereby assure fast opening motion of the poppet;

E. and said poppet control passage comprising a tubular member that forms part of the mechanism and extends a distance forwardly from said end surface of the poppet and into the bypass, said forwardly extending tubular member being substantially smaller in outside diameter than the bypass so as to present little obstruction to bypass flow of fluid from the return passage to the supply passage, and assuring against turbulence that tends to produce undesirable pressure buildup at a zone immediately ahead of the poppet, due to said bypass flow, that would otherwise cause the pressure in the chamber to rise accordingly and create a tendency for premature closure of the poppet.

8. The relief valve mechanism of claim 7, wherein said body of the mechanism comprises:

A. a casing providing a cartridge in which the relief poppet is slidably contained, said casing having
   (1) a hole through its front adapted to provide said part of the high pressure fluid supply line and said bypass.
   (2) an internal seat through which said hole opens to the interior of the casing, and with which the poppet cooperates,
   (3) and a hole in its side behind the seat, adapted to provide said part of the return line.

References Cited by the Examiner
UNITED STATES PATENTS

| | | | |
|---|---|---|---|
| 538,703 | 5/95 | Schreidt | 137—491 |
| 2,230,644 | 2/41 | Horta | 251—43 |
| 2,989,072 | 6/61 | Banker | 137—491 |
| 3,100,503 | 8/63 | Tennis | 137—491 |

MARTIN P. SCHWADRON, *Acting Primary Examiner.*
M. CARY NELSON, *Examiner.*